United States Patent
Ritter

(10) Patent No.: US 6,214,182 B1
(45) Date of Patent: Apr. 10, 2001

(54) DEVICE FOR THE ELECTROCHEMICAL TREATMENT OF WATER OR WASTE WATER BY ELECTROFLOCCULATION

(76) Inventor: Johann W. Ritter, Ehrenhainstrasse 89a, Wuppertal (DE), 42329

( * ) Notice: Subject to any disclaimer, the term of this patent is extended or adjusted under 35 U.S.C. 154(b) by 0 days.

(21) Appl. No.: 09/445,495

(22) PCT Filed: Jun. 8, 1998

(86) PCT No.: PCT/EP98/03405

§ 371 Date: Dec. 7, 1999

§ 102(e) Date: Dec. 7, 1999

(87) PCT Pub. No.: WO98/56720

PCT Pub. Date: Dec. 17, 1998

(30) Foreign Application Priority Data

Jun. 8, 1997 (DE) .............................................. 197 24 005

(51) Int. Cl.[7] .................................................. C25B 9/00
(52) U.S. Cl. .............. 204/273; 204/275.1; 204/277; 204/278.5; 204/242; 204/660; 204/672; 204/673
(58) Field of Search ................. 204/278.5, 273, 204/660, 672, 673, 277, 242, 275.1

(56) References Cited

U.S. PATENT DOCUMENTS

| | | | |
|---|---|---|---|
| 1,478,714 | * 12/1923 | Landreth | 204/275.1 |
| 3,944,478 | * 3/1976 | Kuji et al. | 204/275.1 |
| 4,048,038 | * 9/1977 | Kunkle | 204/180 R |
| 4,132,626 | * 1/1979 | Kunkle | 204/301 |
| 4,908,109 | * 3/1990 | Wright | 204/275.1 |
| 4,983,265 | * 1/1991 | Maruyama | 204/277 |
| 6,099,703 | * 8/2000 | Syversen et al. | 204/273 |

* cited by examiner

Primary Examiner—Bruce F. Bell
(74) Attorney, Agent, or Firm—McCormick, Paulding & Huber LLP

(57) ABSTRACT

Disclosed is an apparatus for electrochemical treatment of waste water by electroflocculation. The apparatus uses an arrangement of electrodes and an anode scraping device, whereby the sword-shaped anode(s) are flanked by cathodes made in the same manner, on which the support structure for the anode scraping devices is supported. Transport of the oxide crusts scraped off the anode surface towards the lower reactor end is supported by a gas stream fed into the electrolytic gap through hollow sections which serve the purpose of spacers for the electrodes. The anodes may consist of several individual sheets, with intermediate layers for lowering the frictional resistance when withdrawing individual sheets. The liquid seal of the upper reactor side in the area of the scraping device is achieved by a plug of elastic, electrically nonconductive material.

20 Claims, 4 Drawing Sheets

DEVICE FOR THE ELECTROCHEMICAL TREATMENT OF WATER OR WASTE WATER BY ELECTROFLOCCULATION

FIELD OF THE INVENTION

The invention relates to the field of electrochemical waste water treatment. Precipitation (flocculation) of the contaminant load, which is present in colloidal state, of the treated waste water is performed here by subjecting it to low-voltage electrolysis. This method is called "electroflotation" or, more precisely, "electroflocculation".

BACKGROUND OF THE INVENTION

Apparatus for electrochemical waste treatment via electroflocculation is known, such as from DE-A-4416973. The apparatus disclosed thereinessentially consists of a reactor housing, which is closed at its upper side, in horizontally inclined arrangement containing upright plate- or sword-shaped electrode sheets of a width-length ratio of less than one. The waste water is pumped through this reactor in the main direction of the longitudinal reactor axis and leaves the same via an overflow weir at its upper front. At the same time, a stream of gas is introduced into the lower side of the reactor, which is preferably fed by exhaust air from the pneumatically operated waste water circulation pump.

As compared to other known apparatus for electroflocculation, the apparatus known from DE-A-4416973 possesses the following improvements:
- easy, i.e. energy-saving, insertion and replacement of the electrodes;
- easy removal of the built-up electrode sludge through the lower end of the reactor housing due to use of the force of gravity;
- inhibition of foaming in the reactor;
- safety from oxyhydrogen gas explosions.

These and other known apparatuses for electroflocculation have the deficiency that the metal oxide layers of little electrical conductivity can build up on the anode surfaces and considerably impede the passage of electric current. These layers may also lead to short circuits due to bridge formation between the electrodes and therefore to an interruption of the electrolytic process.

SUMMARY OF THE INVENTION

The invention is based on the problem to improve an apparatus for removal of the solid reaction products built up on the anode.

In one aspect of the invention, removal of the solid reaction products from the anode is effected by mechanical action by means of scraper strips which are supported and guided on a support structure which, in turn, is supported on at least two electrodes, preferably the cathodes. This has the advantage that the direct positive locking between the electrode package and the scraping device is maintained, also in the case of thermally or mechanically caused displacements between the electrodes and the reactor housing.

In another aspect of the invention which may be applied independently of but preferably together with the foregoing aspect, removal of the reaction products coming off or scraped off the anode is assisted by targeted feeding of a stream of gas, for example air, into each gap between the electrodes.

BRIEF DESCRIPTION OF THE DRAWINGS

These and other features of the invention are more fully set forth with reference to the detailed description and the accompanying drawings, in which.

DETAILED DESCRIPTION OF THE PREFERRED EMBODIMENTS

Figure 1:
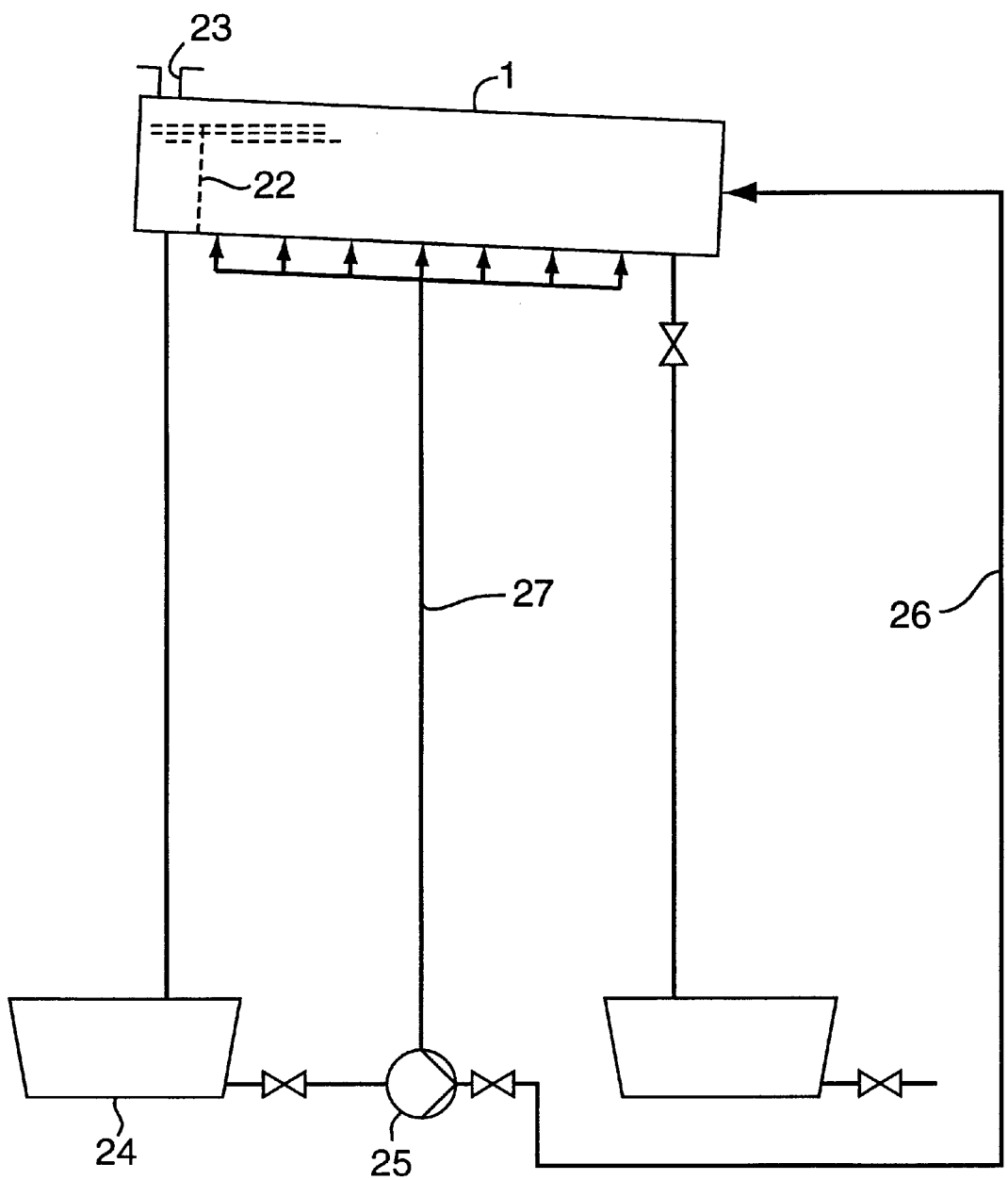
FIG. 1 is a schematic diagram of the entire water or waste water treatment apparatus in which the reactor housing, which is arranged in horizontally inclined position, is shown in a side view.

FIG. 1 shows the reactor scheme on which the invention is based. Reference number 1 indicates the housing of reactor which is arranged in horizontally inclined position. Reference number 22 indicates the overflow weir at the reactor head, over which the waste water, after having passed the reactor zone, flows into a hood 23 and from there into a tank 24 which is placed underneath. Reference number 25 indicates the compressed-air-operated circulation pump which feeds the waste water to be treated to the reactor via a pipe 26. A pipe 27 feeds the pump exhaust air into the reactor.

Figure 2:
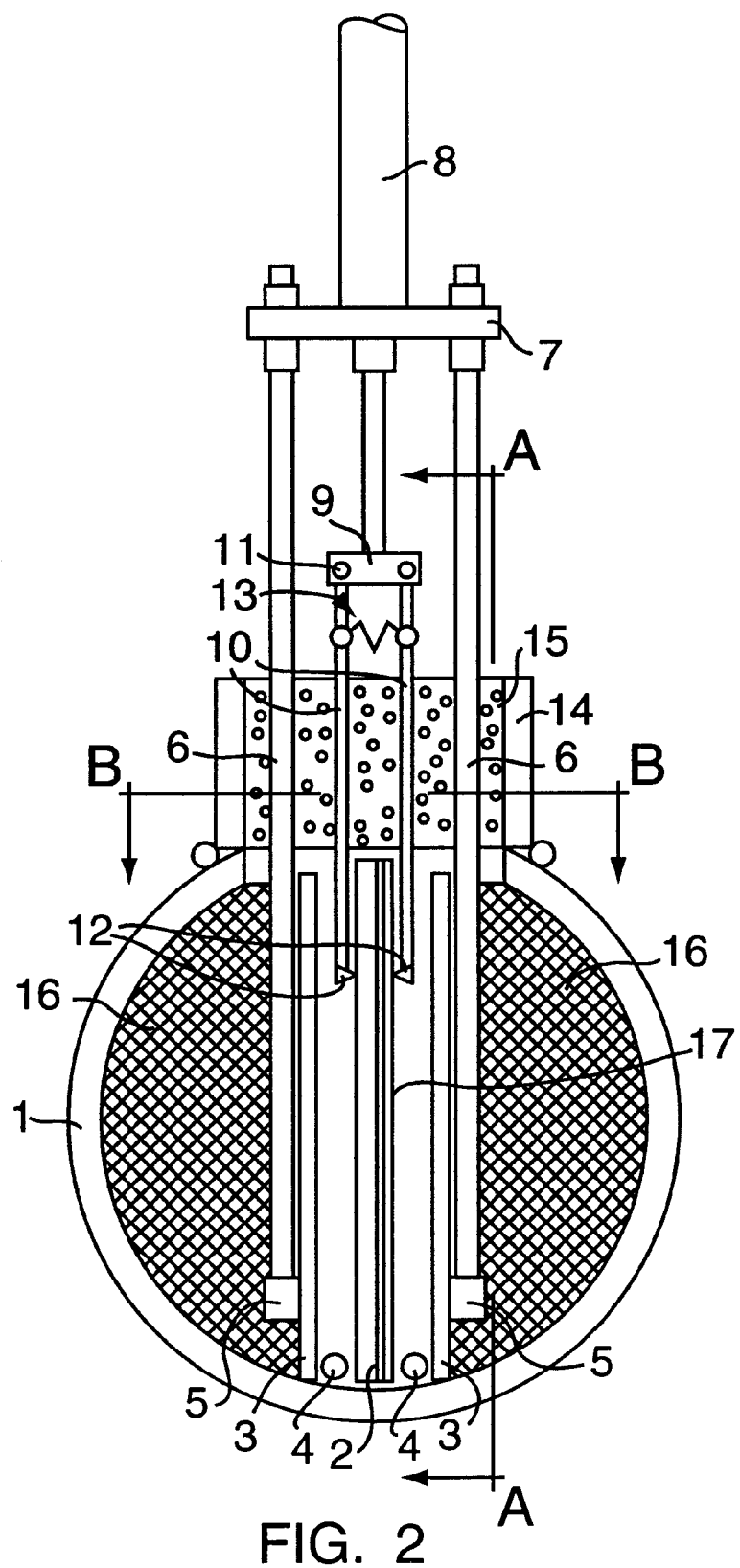
FIG. 2 is a cross section through the reactor housing, vertically to the longitudinal axis thereof.

FIG. 2 shows the reactor housing 1 of tubular shape, anode 2, which is vertically arranged approximately in the reactor axis, and the cathode sheets 3 arranged next to it. Onto their outer sides, nuts 5 are welded, into which supporting bars 6 are screwed. Above the reactor housing, the supporting bars 6 are connected by a tie-bar 7. Attached thereto is a pneumatically driven piston/cylinder unit 8 for the upward and downward movements of a beam 9 on which pendulum rods 10 are attached by joints 11, which carry scraper strips 12 of electrically non-conductive material at their lower end. The pendulum rods 10 are pulled against each other by means of the tensile force of a pretensioning means 13, for example a spring, whereby the scraper strips 12 are pressed against the sides of anode 2.

In order to guarantee a liquid-tight closure of the upper reactor side, a well 14 with inserted sealing pad 15 of elastomer material is located here in the area of the scraping device, which encloses the supporting bars 6 and the pendulum rods 10 in an elastically sealing manner, whereby the sealing effect is maintained due to the elastic properties of sealing pad 15 even if the angular position of the pendulum rods 10 vis-à-vis the vertical center level of the reactor housing changes during operation with diminishing anode thickness.

Figure 4:
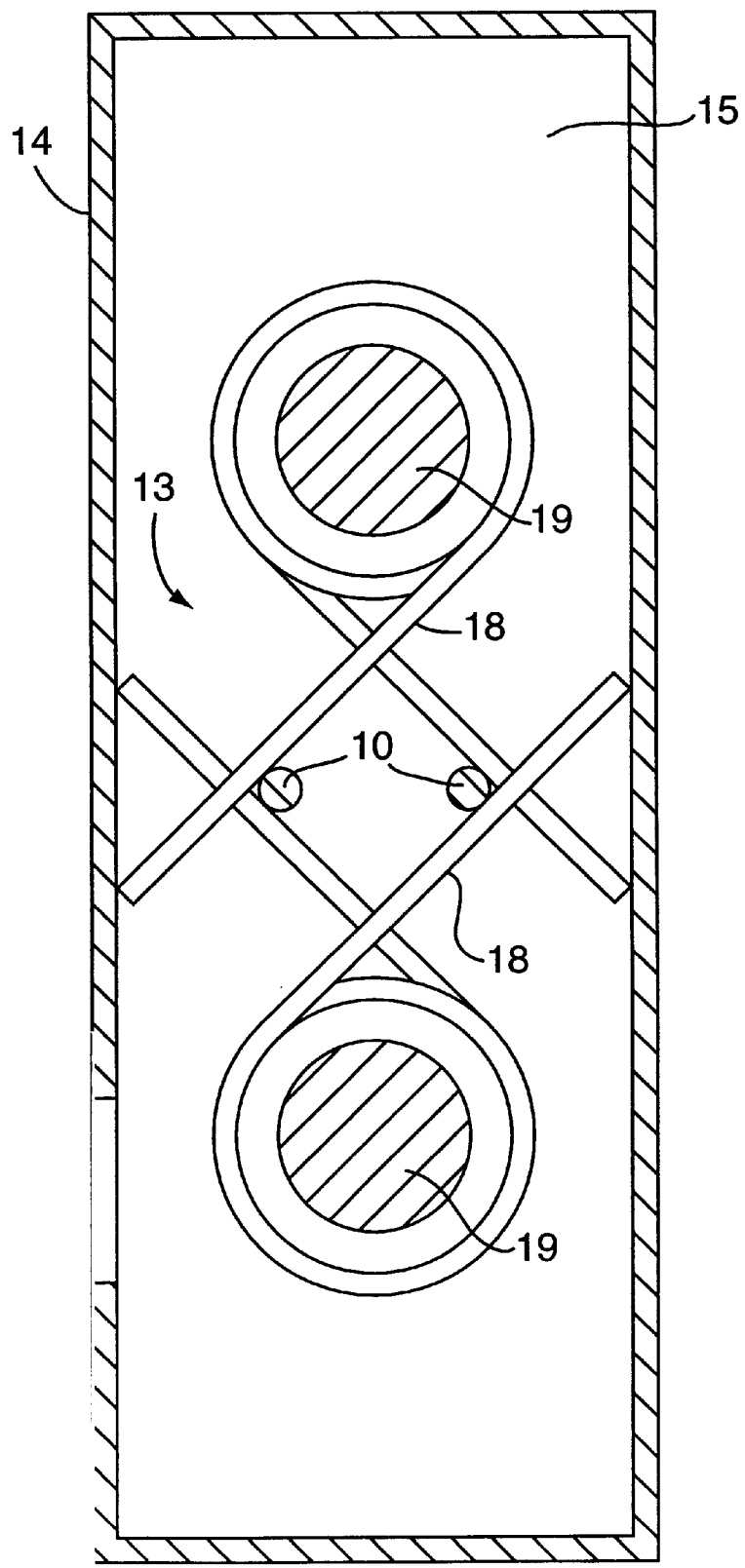
FIG. 4 is a cross section through the support structure of the scraping device in accordance with sectional axis B—B of FIG. 2 above the reactor housing in accordance with another embodiment of this invention.

In the embodiment of FIG. 4, the pretensioning means 13, which applies a tensile force to the pendulum rods 10, is arranged outside the reactor housing 1, which facilitates changing of the tensile force by replacing or otherwise modifying the tensioning device.

It is a further advantage to use at least one torsion spring 18 as pretensioning means 13, which is arranged in the area of well 14 which encloses the sealing pad 15. This improves the lever arm of the force by which spring 18 acts upon the pendulum rods 10 and the scraper strips 12.

FIG. 4 shows a preferred embodiment of the present invention in which the tensioning device is equipped in the form of two torsion springs 18, each arranged on a spike 19 in the area of well 14 outside the reactor space and whose lever arms rest against the pendulum rods 10. Upon upward or downward movement of beam 9, the pendulum rods 10 slide on the arms of the torsion springs 28, which movement may be facilitated by inserting antifriction elements (not shown).

One advantage of supporting the anode scraping device on the cathode sheets according to the invention rather than on the reactor housing is the direct positive locking between electrode package and scraping device independent of thermally or mechanically caused dimensional displacements between the different materials.

The oxide sludge removed from the anode surfaces by the upward and downward movements of the scraping device falls down onto the reactor bottom, where it is conveyed towards the lower reactor end due to the reactor's inclined position, and can be drained there from time to time into a receiving tank arranged beneath.

Transport of the metal oxide in the electrolytic gap along the reactor bottom is assisted according to the invention by using tubular hollow sections 4 of electrically nonconductive material for fixing the electrode spacing. These hollow sections have top bores through which a stream of gas, preferably the pump exhaust air into the reactor, flows back whereby the resultant fluidized bed assists the transport of solids along the reactor bottom. The displacement plugs 16 arranged laterally next to the outer surfaces of the cathodes guarantee compulsory guidance of the waste water through the electrolytic gap.

In order to facilitate replacement of spent anodes it is advantageous to make these as a sheet stack with at least 2 individual sheets placed side by side. To lower the sliding resistance when drawing out individual sheets, it is advantageous to provide the contact surfaces of the individual sheets with an intermediate layer which supports sliding, for example plastic films or a varnish coating, as indicated in FIG. 2 under reference number 17.

Figure 3:
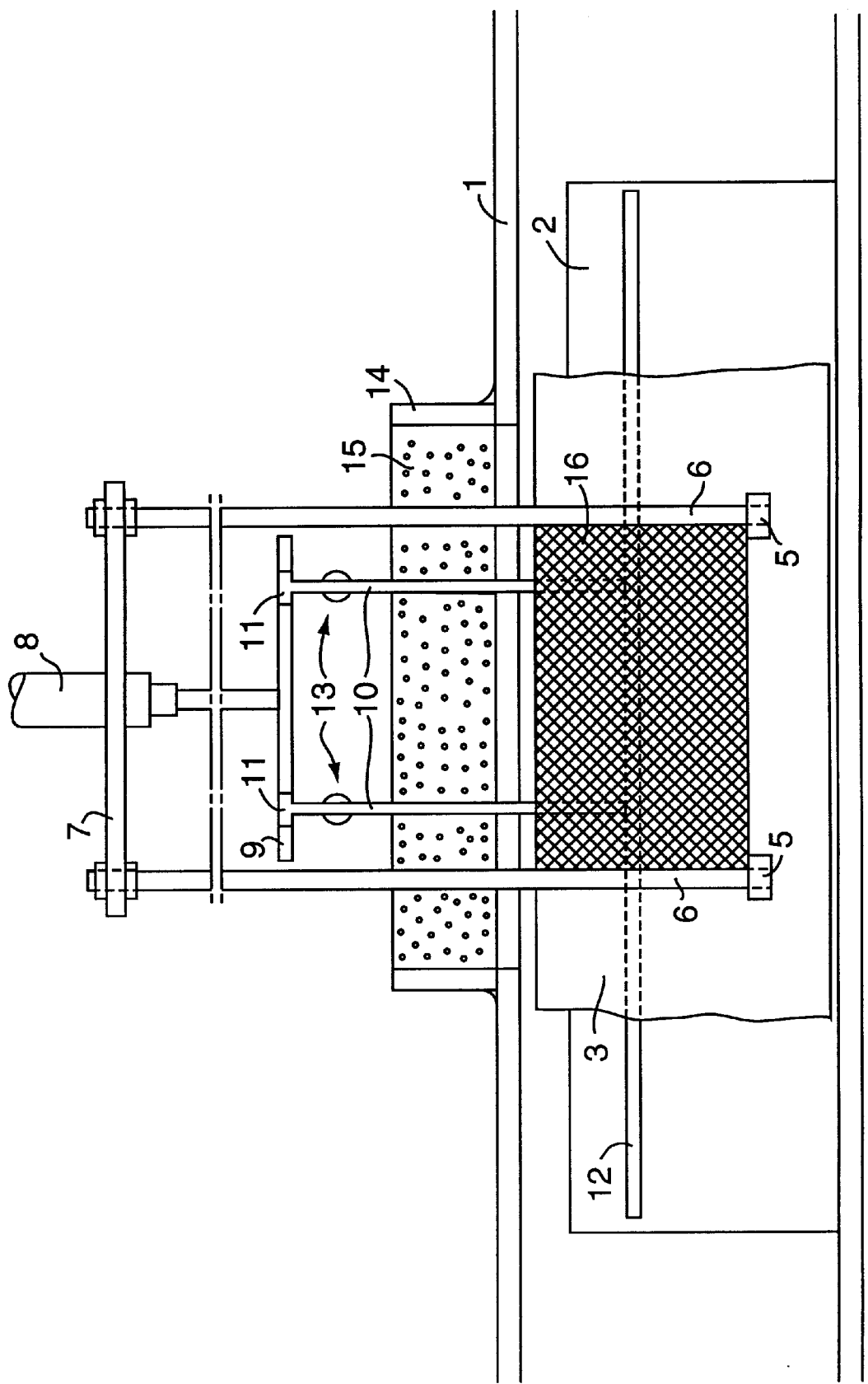
FIG. 3 is a longitudinal section through the reactor housing in accordance with sectional axis A—A of FIG. 2, with a side view of the scraping device.

FIG. 3 shows a longitudinal section through the reactor. For a better understanding, both ends of the cathode sheet which is located in front when looked at in viewing direction are cut off along the wavelike sectional line so that the scraper strip 12 of this reactor side is only visible in the cut-off part of this cathode sheet. The reference numbers of FIG. 3 are identical with those of FIG. 2.

What is claimed is:

1. An apparatus for the electrochemical treatment of water or waste water by electroflocculation, comprising a reactor housing having plate-shaped electrodes therein, the electrodes including at least one anode on which solid reaction products build up during operation, and two cathodes arranged at a distance on both sides of the anode, and a supporting structure attached to at least two of the electrodes, the supporting structure carrying a scraping device which can be moved upward and downward to clean both surfaces of the anode.

2. An apparatus according to claim 1 wherein the reactor housing is arranged with its longitudinal axis at a small angle of inclination towards the horizontal.

3. An apparatus according to claim 1, wherein the scraping device includes scraper strips, and wherein the pressing force by which the scraper strips of the scraping device are sitting can be adjusted via a pretensioning means arranged outside the reactor housing.

4. An apparatus according to claim 3, wherein the pretensioning means is elastic, and the scraper strips support pendulum rods made of rigid material so that the force by which the scraper strips rest against the electrode is predetermined by the elastic pretensioning means and remains constant even with a change in the thickness of the electrode sheet.

5. An apparatus according to claim 1. wherein the reactor housing is closed liquid-tight on its upper side in the area of the scraping device by a sealing pad of elastic and electrically insulating material.

6. An apparatus according to claim 5, wherein the pretensioning means is made as a torsion spring which is stationarily arranged in the area of a well of the housing, which encloses the sealing pad.

7. An apparatus according to claim 1, wherein the anode can be removed from the reactor housing and replaced while the cathodes and the hollow sections remain in the reactor housing.

8. An japparatus according to claim 1, wherein the anode includes a stack of at least two individual sheets.

9. An apparatus according to claim 8, wherein a sliding layer is located between the individual sheets of anode, which lowers the frictional resistance between the individual sheets when the individual sheets are inserted in or pulled out of the reactor housing.

10. An apparatus according to claim 8, wherein a sliding layer is located between the individual sheets of anode, which lowers the frictional resistance between the individual sheets when the individual sheets are inserted in or pulled out of the reactor housing.

11. An apparatus for the electrochemical treatment of water or waste water by electroflocculation, comprising a reactor housing having plate-shaped electrodes therein, the electrodes including at least one anode on which solid reaction products build up during operation and two cathodes arranged at a distance on both sides of the anode, and a gas distributing pipe with gas outlet openings, which is to be connected to a gas supply source, arranged in each gap between the anode and a cathode in the bottom area of the reactor housing, by which a gas fluidized bed for removal of the solid reaction products separated from the anode can be provided.

12. An apparatus according to claim 11, wherein the gas supply pipes include hollow sections inserted as spacers between the anode and the cathodes arranged at both sides thereof.

13. An apparatus according to claim 12, wherein the hollow sections are firmly connected to the reactor housing.

14. An apparatus according to claim 11, wherein the reactor housing is arranged with its longitudinal axis at a small angle of inclination towards the horizontal.

15. An apparatus according claim 11, wherein the reactor housing is closed liquid-tight on its upper side in the area of the scraping device by a sealing pad of elastic and electrically insulating material.

16. An apparatus according to claim 15, wherein the pretensioning means is made as a torsion spring which is stationarily arranged in the area of a well of the reactor housing, which encloses the sealing pad.

17. An apparatus according to claim 11, wherein the anode can be removed from the reactor housing and replaced while the cathodes and the hollow sections remain in the reactor housing.

18. An apparatus according to claim 17, wherein a sliding layer is located between the individual sheets of anode, which lowers the frictional resistance between the individual sheets when the individual sheets are inserted in or pulled out of the reactor housing.

19. An apparatus according to claim 11, wherein the anode includes a stack of at least two individual sheets.

20. An apparatus according to claim 19, wherein a sliding layer is located between the individual sheets of anode, which lowers the frictional resistance between the individual sheets when the individual sheets are inserted in or pulled out of the reactor housing.

* * * * *

UNITED STATES PATENT AND TRADEMARK OFFICE
CERTIFICATE OF CORRECTION

PATENT NO. : 6,214,182 B1  
DATED : April 10, 2001  
INVENTOR(S) : Johann W. Ritter Page 1 of 1

It is certified that error appears in the above-identified patent and that said Letters Patent is hereby corrected as shown below:

<u>Column 4,</u>  
Line 9, after "An", please delete "japparatus" and insert -- apparatus --.

Signed and Sealed this

Sixteenth Day of October, 2001

*Attest:*

NICHOLAS P. GODICI  
*Attesting Officer*     *Acting Director of the United States Patent and Trademark Office*